United States Patent
Cao et al.

(10) Patent No.: US 7,284,006 B2
(45) Date of Patent: Oct. 16, 2007

(54) METHOD AND APPARATUS FOR BROWSING DOCUMENT CONTENT

(75) Inventors: Yunbo Cao, Beijing (CN); Hang Li, Beijing (CN)

(73) Assignee: Microsoft Corporation, Redmond, WA (US)

(*) Notice: Subject to any disclaimer, the term of this patent is extended or adjusted under 35 U.S.C. 154(b) by 509 days.

(21) Appl. No.: 10/714,540

(22) Filed: Nov. 14, 2003

(65) Prior Publication Data
US 2005/0108266 A1 May 19, 2005

(51) Int. Cl.
*G06F 17/00* (2006.01)

(52) U.S. Cl. .................................. 707/101; 707/104.1

(58) Field of Classification Search ............... None
See application file for complete search history.

(56) References Cited

U.S. PATENT DOCUMENTS

| | | | | |
|---|---|---|---|---|
| 6,493,744 | B1* | 12/2002 | Emens et al. | 709/203 |
| 2002/0038348 | A1* | 3/2002 | Malone et al. | 709/217 |
| 2003/0212686 | A1* | 11/2003 | Chu-Carroll et al. | 707/100 |
| 2006/0259476 | A1* | 11/2006 | Kadayam et al. | 707/3 |

OTHER PUBLICATIONS

Buyukkokten et al. ("Seeing the Whole in Parts: Text Summarization for Web Browsing on Handheld Devices", WWW10, May 2-5, 2001, Hong Kong).*

Chen et al. (Detecting Web Page Structure for Adaptive Viewing on Small Form Factor Devices, WWW2003, May 20-24, 2003, Dudapest Hungary).*

Chen et al., "Detecting Web Page Structure for Adaptive Viewing on Small Form Factor Devices", WWW2003, May 20-24, 2003, Budapest Hungary.

Li et al., "Automatic Extraction of key Phrases for Texts", Technical Memo 2002.

Buyukkokten et al., "Seeing the Whole in Parts: Text Summarization for Web Browsing on Handheld Devices", WWW10, May 2-5, 2001, Hong Kong.

Li et al., "Topic Analysis Using a Finite Mixture Model*", Proceeding of the 2000 Joing ACL SIGDAT Conference on Empirical Methods in Natural Language Processing and Very Large Corpora.

Chien, "Pat-Tree-Based Keyword Extraction for Chinese Information Retrieval", Proceedings of the ACM SIGIR International Conference on Information Retrieval, 1997.

Hearst, "TextTiling: Segmenting Text into Mulit-Paragraph Subtopic Passages", Computational Linguistics, 2391), 33-64, Mar. 1997.

Voutilainen, "Nptool, a dectector of English noun phrases*", In Proceedings of the Workshop on Very Large Corpora, pp. 48-57, 1993.

* cited by examiner

*Primary Examiner*—Joon Hwan Hwang
(74) *Attorney, Agent, or Firm*—Todd R. Fronek; Westman, Champlin & Kelly, P.A.

(57) ABSTRACT

A computer-implemented method is provided that includes receiving a document and determining a file type for the document. In addition, the document is segmented into blocks of text as a function of the file type and at least one keyword and a summary is generated for the document.

13 Claims, 14 Drawing Sheets

320

Title: Beijing Introduction — 322

Section 1. introduction, located, capital
<keywords: ....> <summary: ....>

Section 2. economy, growth, economical, services
<keywords: ....> <summary: ....>

Section 3. culture, arts, peking opera — 324
<keywords: ....> <summary: ....>

Section 4. Qing dynasty, Ming dynast, history
<keywords: ....> <summary: ....>

Culture

Beijing has more colleges and universities...

ADDITIONAL TEXT HERE

...The end.

FIG. 13

METHOD AND APPARATUS FOR BROWSING DOCUMENT CONTENT

BACKGROUND OF THE INVENTION

The present invention relates to personal mobile computing devices commonly known as mobile devices. More particularly, the present invention relates to a system and method for viewing content of documents in a user-friendly manner.

Mobile devices are small electronic computing devices often referred to as personal digital assistants. Many such mobile devices are hand-held devices, or palm-size devices, which comfortably fit within the hand. One commercially available mobile device is sold under the trade name hand-held PC (or H/PC) having software provided by Microsoft Corporation of Redmond, Wash.

Generally, the mobile device includes a processor, random access memory (RAM) and an input device such as a keyboard and a display. The keyboard can be integrated with a display, such as where the keyboard is incorporated as a touch sensitive display. A communication interface is optionally provided and is commonly used to communicate with a desktop computer. A replaceable or changeable battery powers the mobile device. Optionally, the mobile device can receive power from an external power source that overrides or recharges the built-in battery.

Many mobile devices have access to information through a wireless transmission link. Such information can include electronic mail or pager information including news, weather, sports, traffic and local event information. Additionally, mobile devices are used to browse web or internet content. However, internet content is designed to be rendered on a desktop personal computer and thus are inconvenient to browse and render on a mobile device having a limited screen size. A number of current methods exist for viewing and browsing web content on a mobile device. In some instances, an excerpt of a web page is provided to the mobile device. In other instances, a web page is summarized and provided to the mobile device.

While these methods can be adequate for viewing web pages, a need exists for browsing and rendering various types of files and documents. Browsing a large number of documents for relevant information on a mobile device can be time consuming and frustrating to a user, especially when a user can only view a title or limited excerpt of the document. Thus, there is a need for developing a user-friendly apparatus for browsing and viewing documents on a mobile device.

SUMMARY OF THE INVENTION

A computer-implemented method is provided that includes receiving a document and determining a file type for the document. In addition, the document is segmented into blocks of text as a function of the file type and at least one keyword and a summary is generated for the document.

Another aspect of the present invention is a computer-implemented method. The method includes retrieving a plurality of documents and determining a file type for each of the plurality of documents. Each of the plurality of documents is segmented into blocks of text as a function of the file type and at least one keyword and a summary is determined for each of the plurality of documents. Also, the method includes providing an output of the at least one keyword and summary for each of the plurality of documents.

Yet a further aspect relates to a computer-readable medium including a document retrieval module adapted to retrieve a document from a document source based on a document query request received from a mobile device. The computer-readable medium also includes a document outline parsing module adapted to determine a file type of the document and segment the document into blocks of text based on the file type. A summarization module is adapted to generate at least one keyword and a summary for the document.

BRIEF DESCRIPTION OF THE DRAWINGS

FIG. 12 is an exemplary screen shot of a mobile device.

FIG. 13 is an exemplary screen shot of a mobile device.

DETAILED DESCRIPTION OF ILLUSTRATIVE EMBODIMENTS

Figure 1:
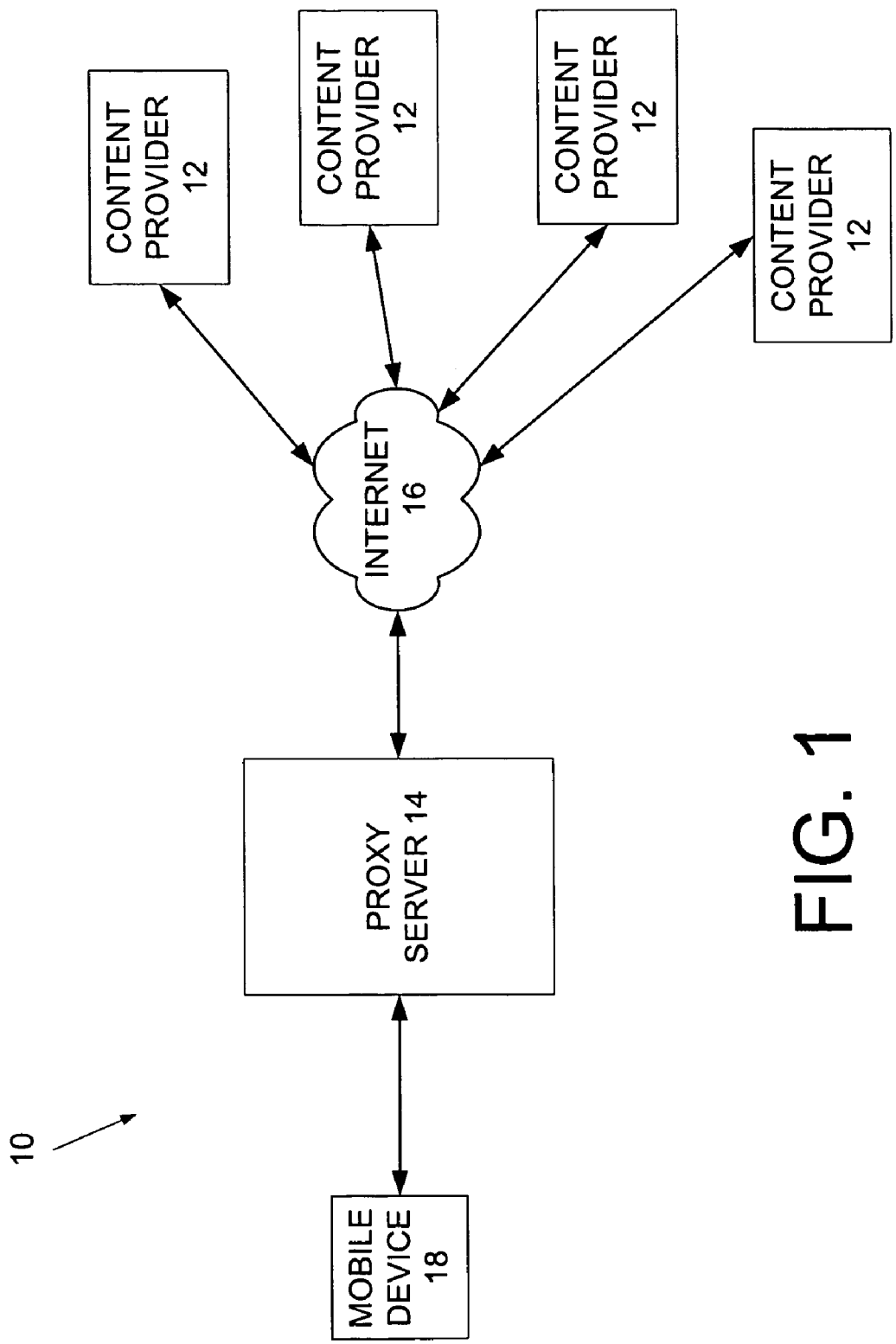
FIG. 1 illustrates an exemplary environment for implementation of the present invention.

FIG. 1 illustrates an environment 10 in which aspects of the present invention are illustratively implemented. Environment 10 includes a plurality of content providers 12 connected to a proxy server 14 through a network 16, such as the internet. Content provider 12 provides various types of data including, for example, files containing worldwide web content, a collection of text-based documents stored on a local server and/or audio files that a user wishes to access. The files on content provider 12 can be stored in standard formats, such as HTML, JPEG, GIF, DOC, TXT, PDF, PPT or WAV data files and include text or data indicative thereof for generating keywords and a summary. Proxy server 14 receives files from content provider 12 and provides a summary and keywords based on the document or portions thereof to mobile device 18.

Figure 2:
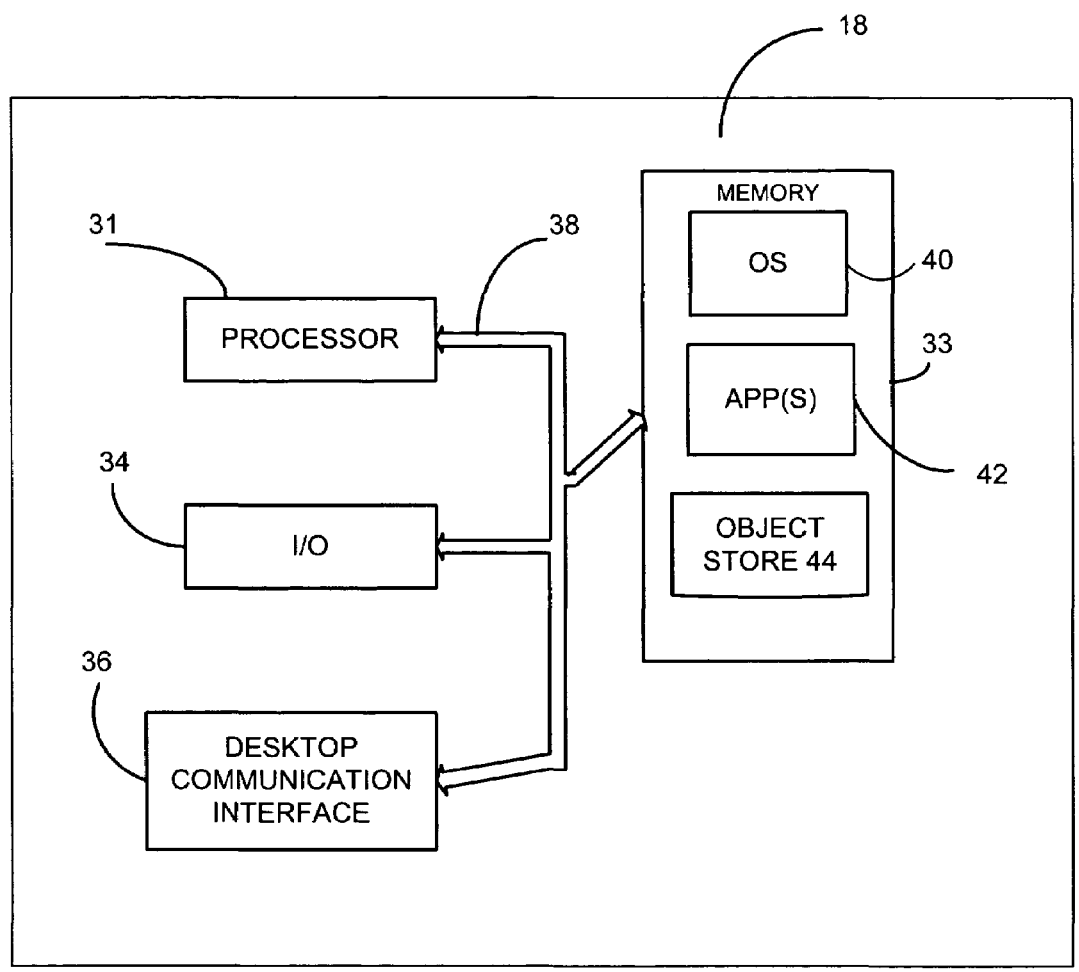
FIG. 2 is a block diagram of a mobile device.

FIG. 2 is a more detailed block diagram of mobile device 18. Mobile device 18 includes processor 31, memory 33, input/output (I/O) components 34 and desktop communication interface 36. In one embodiment, these components of mobile device 18 are coupled for communication with one another over a suitable bus 38.

Memory 33 is preferably implemented as nonvolatile electronic memory such as random access memory (RAM) with a battery back-up module (not shown) such that information stored in memory 33 is not lost when the general power to mobile device 18 is shut down. A portion of memory 33 is preferably allocated as addressable memory for program execution, while another portion of memory 33 is used for storage, such as to simulate storage on a disc drive.

Memory 33 includes operating system 40, an application program 42 (such as a personal information manager or PIM) as well as an object store 44. During operation, operating system 40 is preferably executed by processor 31 from memory 33. Operating system 40, in one embodiment, is a WINDOWS CE brand operating system commercially available from Microsoft Corporation. The operating system 40 can be designed for mobile devices, and can implement database features which can be utilized by application programs through a set of exposed application programming interfaces (APIs) and methods. The objects in an object store 44 are maintained by application programs and operating system 40, at least partially in response to calls to the exposed application programming interfaces and methods.

I/O components 34, in one embodiment, are provided to facilitate input and output operations from a user of mobile device 18. I/O components 34 are described in greater detail with respect to FIGS. 3 and 4.

Desktop communication interface 36 is provided as any suitable communication interface, such as a serial connection, a network interface, an infrared link or a modem connection. Interface 36 is used to communicate with desktop proxy server 14. Thus, interface 36 can include a synchronization module 26 for communicating with proxy server 14.

Figure 3:
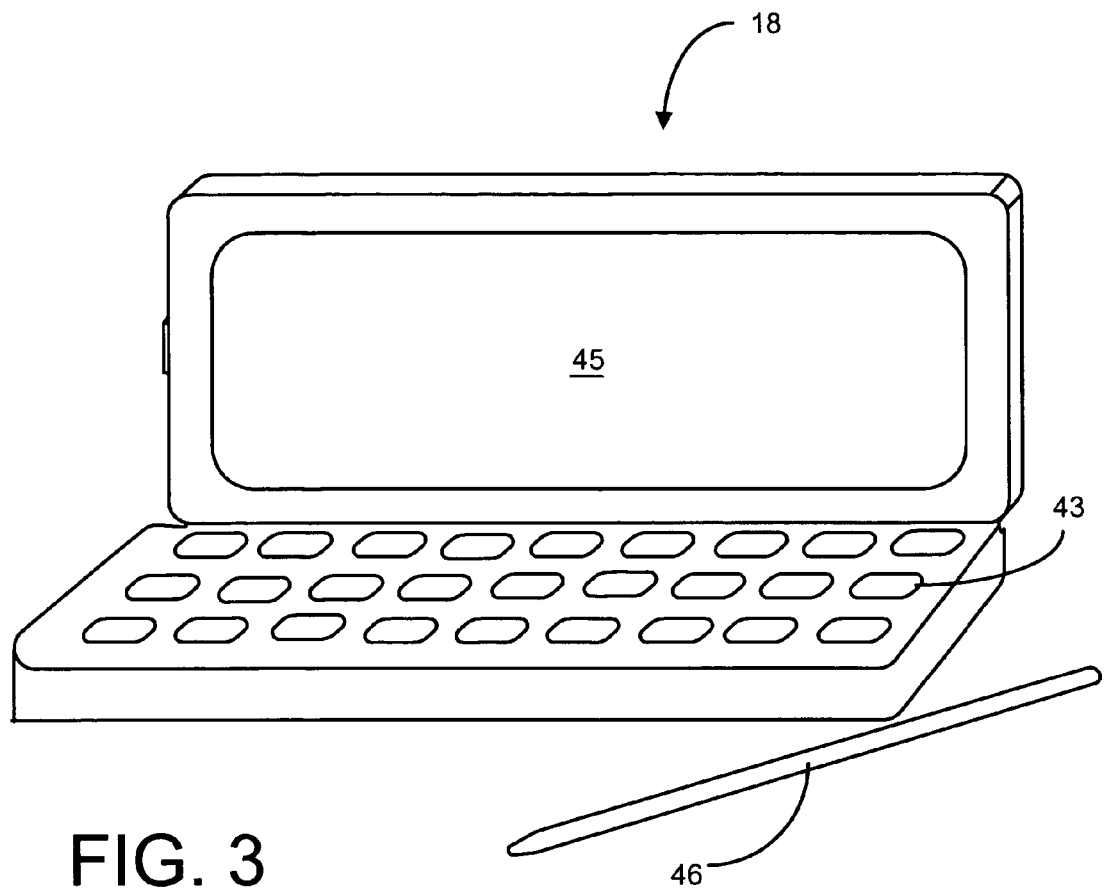
FIG. 3 is an exemplary embodiment of a mobile device.

FIG. 3 is a simplified pictorial illustration of one embodiment of a mobile device 18 which can be used in accordance with the present invention. Mobile device 18, as illustrated in FIG. 3, can be a desktop assistant sold under the designation H/PC having software provided by the Microsoft Corporation. In one embodiment, mobile device 18 includes a miniaturized keyboard 43, display 45 and stylus 46. In the embodiment shown in FIG. 3, display 45 is a liquid crystal display (LCD) which uses a contact sensitive display screen in conjunction with stylus 46. Stylus 46 is used to press or contact the display 45 at designated coordinates to accomplish certain user input functions. Miniaturized keyboard 43 is preferably implemented as a miniaturized alpha-numeric keyboard, with any suitable and desired function keys which are also provided for accomplishing certain user input functions.

Figure 4:
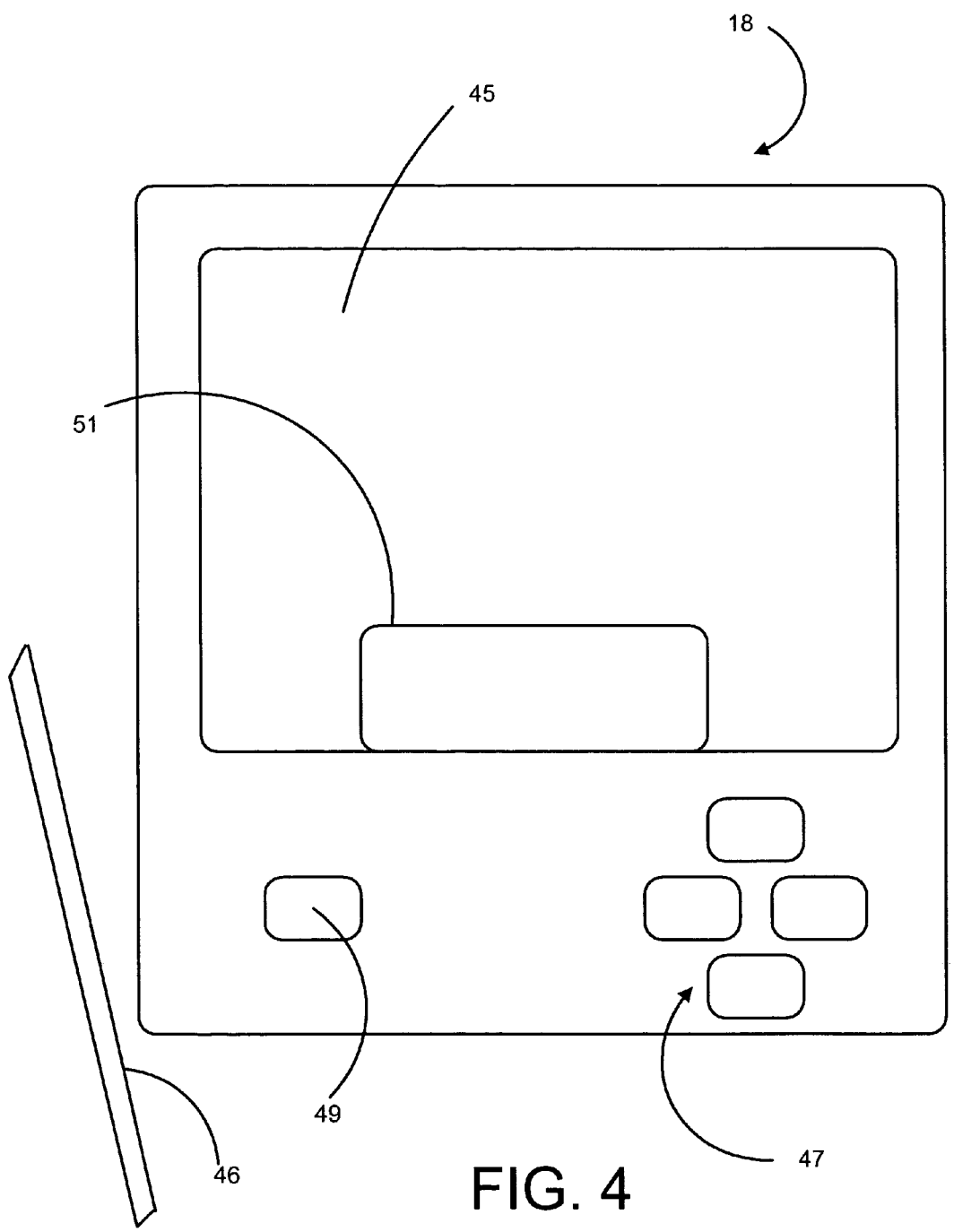
FIG. 4 is another exemplary embodiment of a mobile device.

FIG. 4 is another simplified pictorial illustration of the mobile device 18 in accordance with another embodiment of the present invention. Mobile device 18, as illustrated in FIG. 4, includes some items which are similar to those described with respect to FIG. 3, and are similarly numbered. For instance, mobile device 18, as shown in FIG. 4, also includes touch sensitive screen 45 which can be used, in conjunction with stylus 46, to accomplish certain user input functions. It should be noted that the display 45 for the mobile device as shown in FIGS. 3 and 4 can be the same size as one another, or different sizes from one another, but would typically be much smaller than a conventional display used with a desktop computer. For example, display 45 shown in FIGS. 3 and 4 may be defined by a matrix of only 240×320 coordinates, or 160×160 coordinates, or any other suitable size.

The mobile device 18 shown in FIG. 4 also includes a number of user input keys or buttons (such as scroll buttons 47) which allow the user to scroll through menu options or other display options which are displayed on display 45, or which allow the user to change applications, without contacting display 45. In addition, the mobile device 18 also shown in FIG. 4 also preferably includes a power button 49 which can be used to turn on and off the general power to the mobile device 18.

It should also be noted that, in the embodiment illustrated in FIG. 4, mobile device 18 includes a handwriting area 51. Handwriting area 51 can be used in conjunction with stylus 46 such that the user can write messages which are stored in memory 33 for later use by the mobile device 18. In one illustrative embodiment, the handwritten messages are simply stored in handwritten form and can be recalled by the user and displayed on the display screen 45 such that the user can review the handwritten messages entered into the mobile device 18. In another embodiment, mobile device 18 is provided with a character recognition module such that the user can enter alpha-numeric information into mobile device 18 by writing that alpha-numeric information on area 51 with stylus 46. In that instance, character recognition module in the mobile device 18 recognizes the alpha-numeric characters and converts the characters into computer recognizable alpha-numeric characters which can be used by the application programs 42 in mobile device 18.

Figure 5:
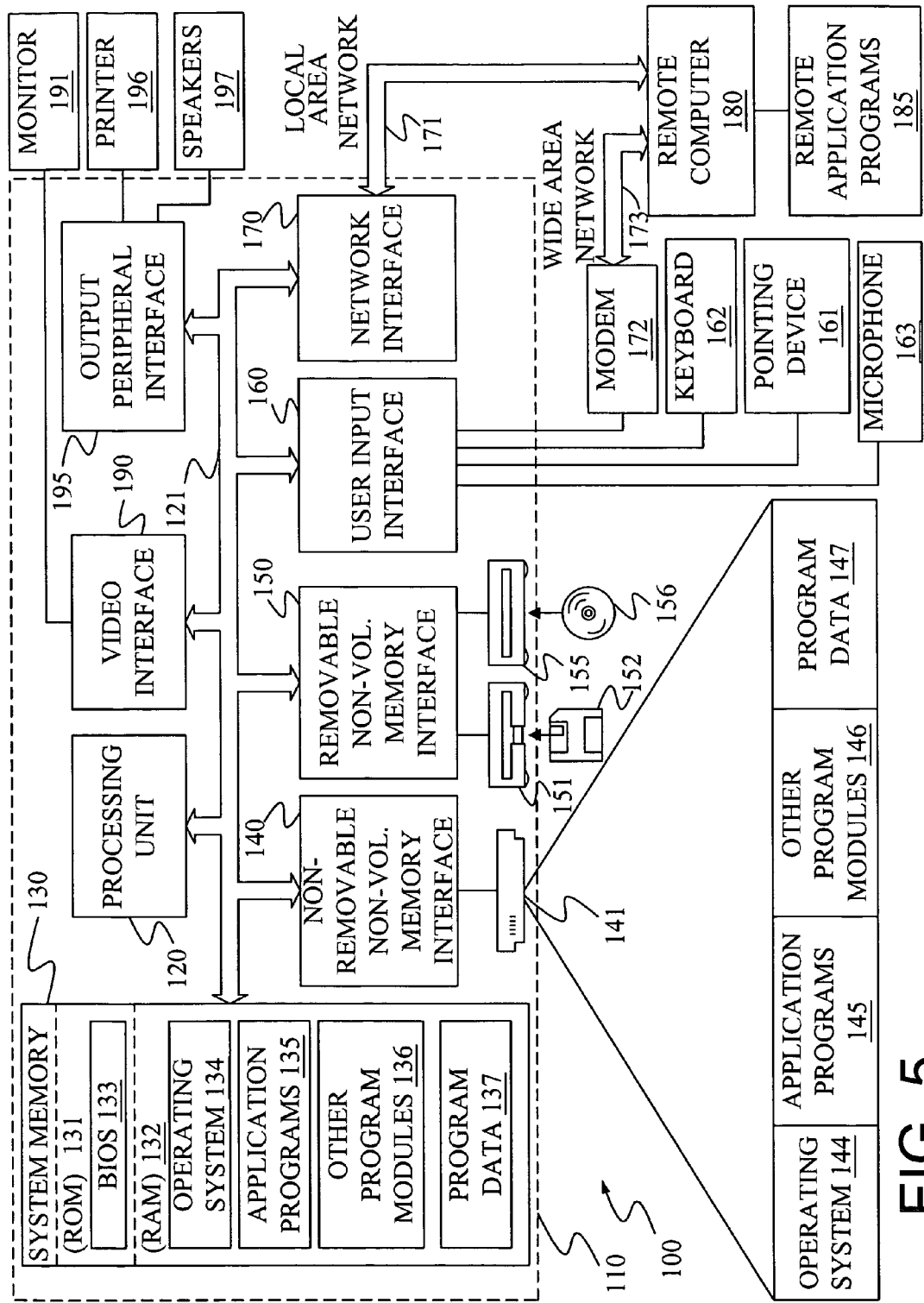
FIG. 5 is an exemplary computer environment.

Prior to discussing the present invention in greater detail, an embodiment of an illustrative environment in which the present invention can be used will be discussed. FIG. 5 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on remote computer 180. It will be appreciated that the network connections shown are exemplary and other means of establishing a communications link between the computers may be used.

Figure 6:
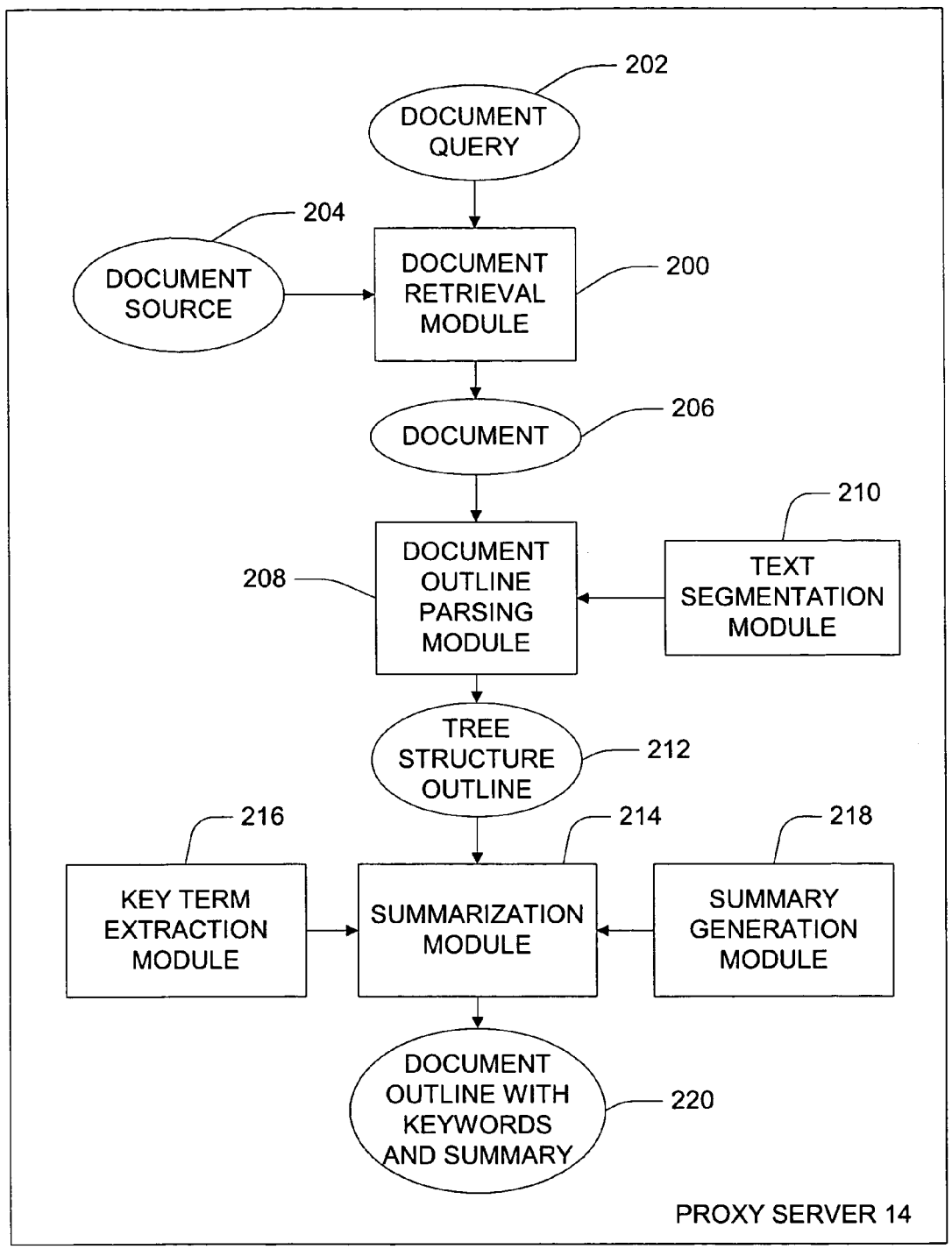
FIG. 6 is a block diagram of modules on a proxy server.

In order to provide document keywords and summaries for user-friendly browsing on to mobile device 18, proxy server 14 includes various modules to retrieve and summarize files. FIG. 6 illustrates a flow chart for modules on proxy server 14. Document retrieval module 200 receives a document query 202 from mobile device 18. Document query 202 may be a request for a single document or a plurality of documents, such as all documents stored in a particular folder or on one or more of the plurality of content providers 12. Given the document query 202, document retrieval module 200 determines, for each document, the document source 204 and retrieves a document 206 to provide as output. Document 206 is then sent to document outline parsing module 208. Document outline parsing module 208 uses text segmentation module 210 in order to segment the document into blocks and sub blocks. The blocks and sub blocks from a tree structure outline 212, which is output by the document outline parsing module 208. Summarization module 214 receives the tree structure outline 212 and uses key term extraction module 216 and summary generation module 218 to create a document outline with keywords and summary 220. In one embodiment, summarization module 214 provides key term extraction and summary generation for each of the blocks and sub blocks provided in tree structure outline 212. The document 220 created by summarization module 214 is then provided to the mobile device 18 for document browsing.

Figure 7:
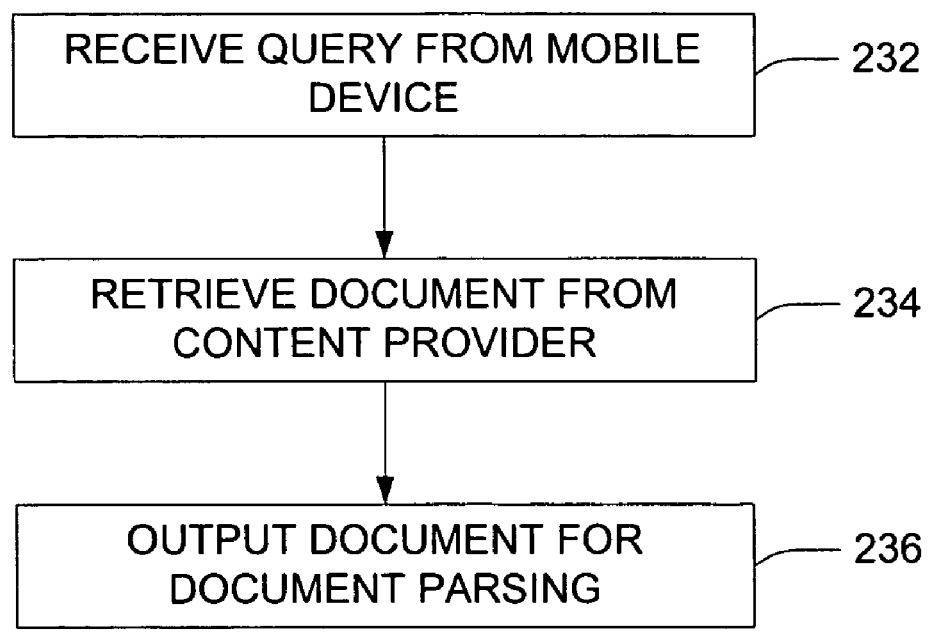
FIG. 7 is an exemplary method performed by a document retrieval module.

FIG. 7 illustrates a method 230 performed by document retrieval module 200 in order to output a document. At step 232, a query is received from the mobile device. The query may consist of a request to retrieve a single document or a collection of documents and/or files from content providers 12. At step 234, the document retrieval module 200 retrieves each document from the plurality of content providers 12. Each document is then output at step 236 in order for document parsing to be performed.

Figure 8:
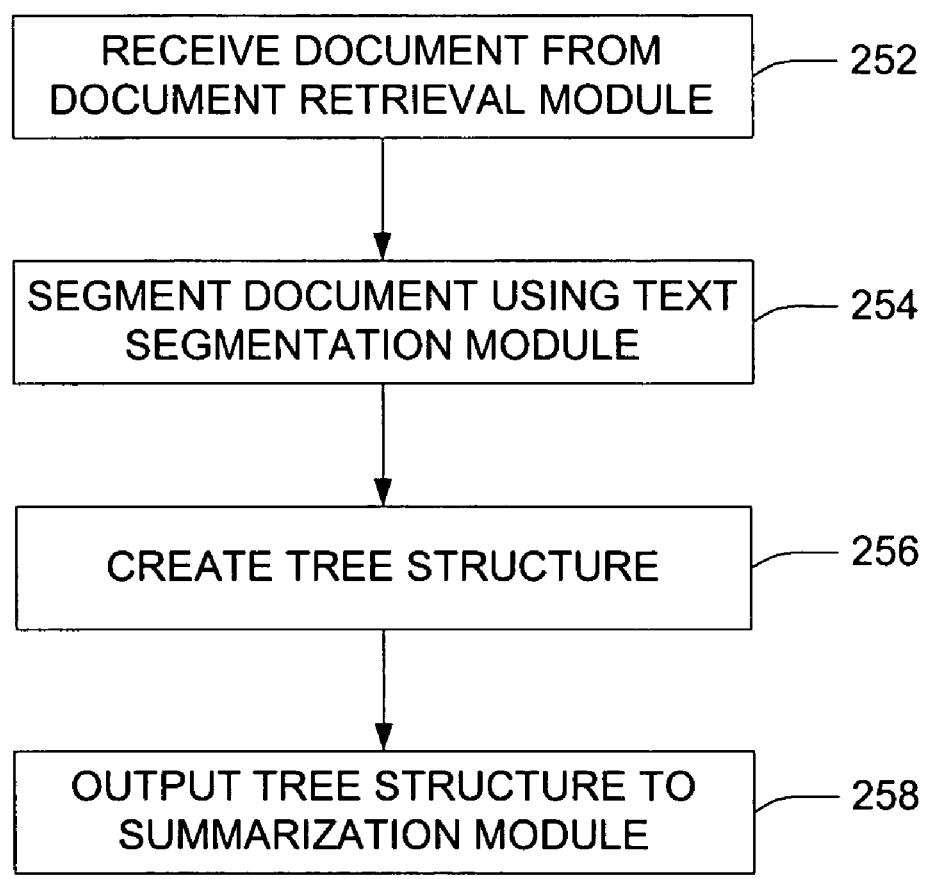
FIG. 8 is an exemplary method performed by a document outline parsing module.

FIG. 8 illustrates a method 250 performed by document outline parsing module 208. The document outline parsing module 208 receives a document from the document retrieval module 200 at step 252. After the document is received, the document outline parsing module 208 segments the document into blocks and sub blocks using the text segmentation module 210 at step 254. After the text segmentation is performed, a tree structure outline is created at step 256 that includes blocks and sub blocks of the document. Once the tree structure is created, the tree structure is then output at step 258 to summarization module 214.

Figure 9:
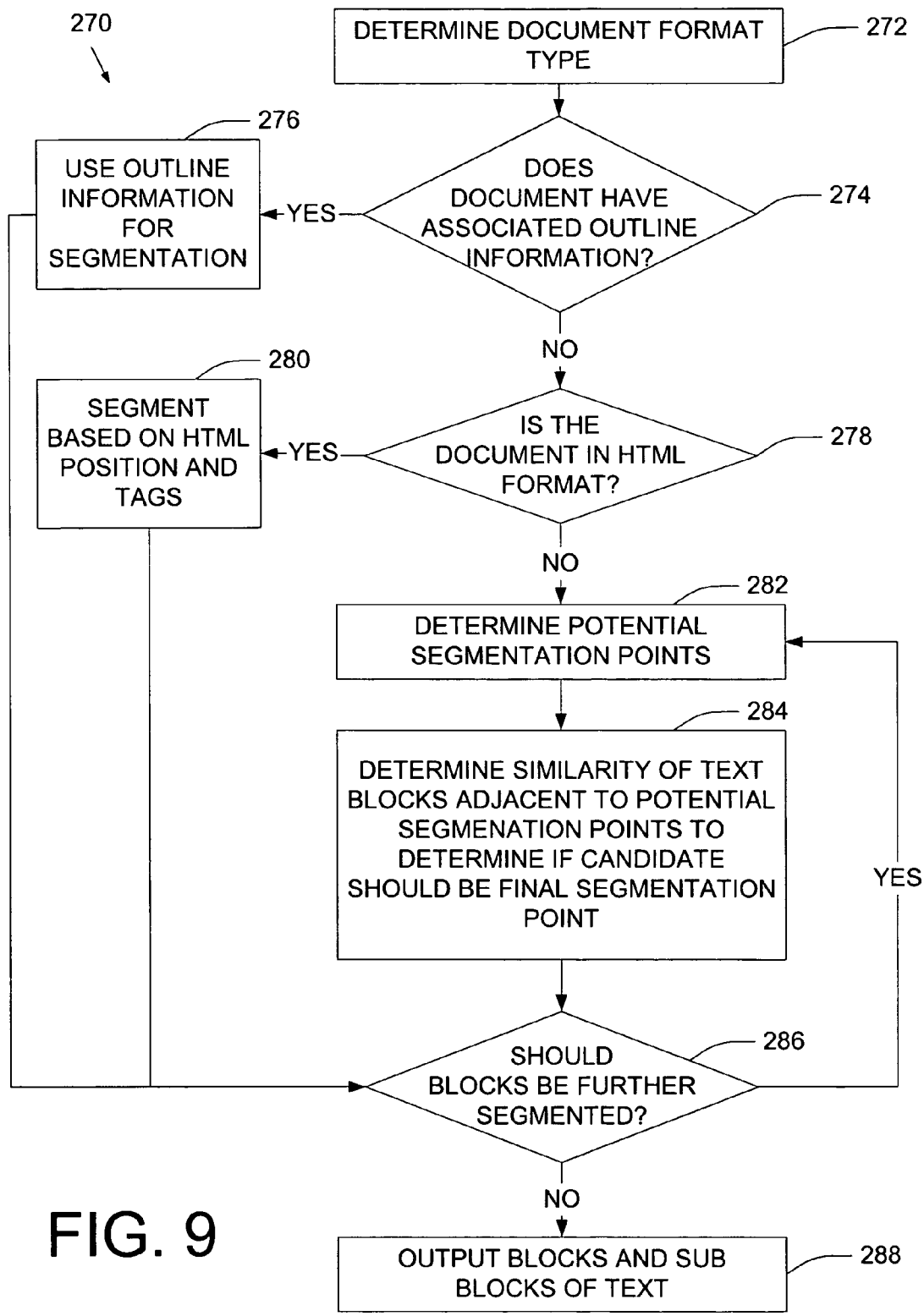
FIG. 9 is an exemplary method performed by a text segmentation module.

FIG. 9 illustrates a method 270 performed by text segmentation module 210. First, text segmentation module 210 determines a format type of the document to be segmented at step 272. The format type for the document may be any type of format including plain text, PDF, HTML, word document, audio file or other type of document. In the case of an audio file, a speech-to-text conversion can be performed as in known in the art to provide text of the audio file.

After determining the format type of the document, method 270 proceeds to step 274 wherein it is determined whether the document has associated outline information that can used for segmentation. In some word processing documents such as Microsoft Word documents, Abode PDF documents and WordPerfect documents, outline information is established by the document author. This outline information includes various headers and section breaks that provide natural candidates for segmentation points. The outline information is used for segmentation at step 276.

If the document does not have associated outline information, it is then determined whether the document is in an HTML format, wherein the document can be segmented based on text positioning and tags at step 280. One method of segmenting HTML pages is disclosed in the paper, "Detecting Web Structure for Adaptive Viewing on Small Form Factor Devices", authored by Yu Chen, Wei-Ying Ma and Hong-Jiang Zhang, the contents of which are hereby incorporated by reference.

In this method of segmentation of an HTML file, a semantic structure is extracted from an HTML web page to identify various content blocks. The content blocks are classified into high-level blocks based on the position of associated text, for example, header blocks, footer blocks, sidebar blocks and body blocks. These blocks are identified based on the position of the associated text as well as associated HTML tags. Furthermore, implicit and explicit separators are detected within the web page to further identify and segment blocks of information. These blocks serve as at least a preliminary tree structure that can be further segmented as described below.

At step 282, text can be segmented by determining potential segmentation points within the document text. In one method, the end of each paragraph in the document is determined and viewed as a candidate point for segmentation. For each candidate point, similarity between adjacent paragraphs, immediately before and after the candidate segmentation point, is calculated at step 284. For example, determining a variational distance between the two paragraphs can be used as a similarity measure. When adjacent paragraphs are dissimilar, a segmentation point is determined. As a result, the document is segmented into various blocks. Further segmentation can be performed also wherein the blocks are further segmented into a number of sub blocks. At step 286, it is determined whether further segmentation is needed. In one embodiment, further segmentation is performed if blocks are too large or, alternatively contain too many words. In order to perform further segmentation, the method returns to step 282. If no further segmentation is needed, the blocks and sub blocks, which create a tree structure, are output at step 288.

Figure 10:
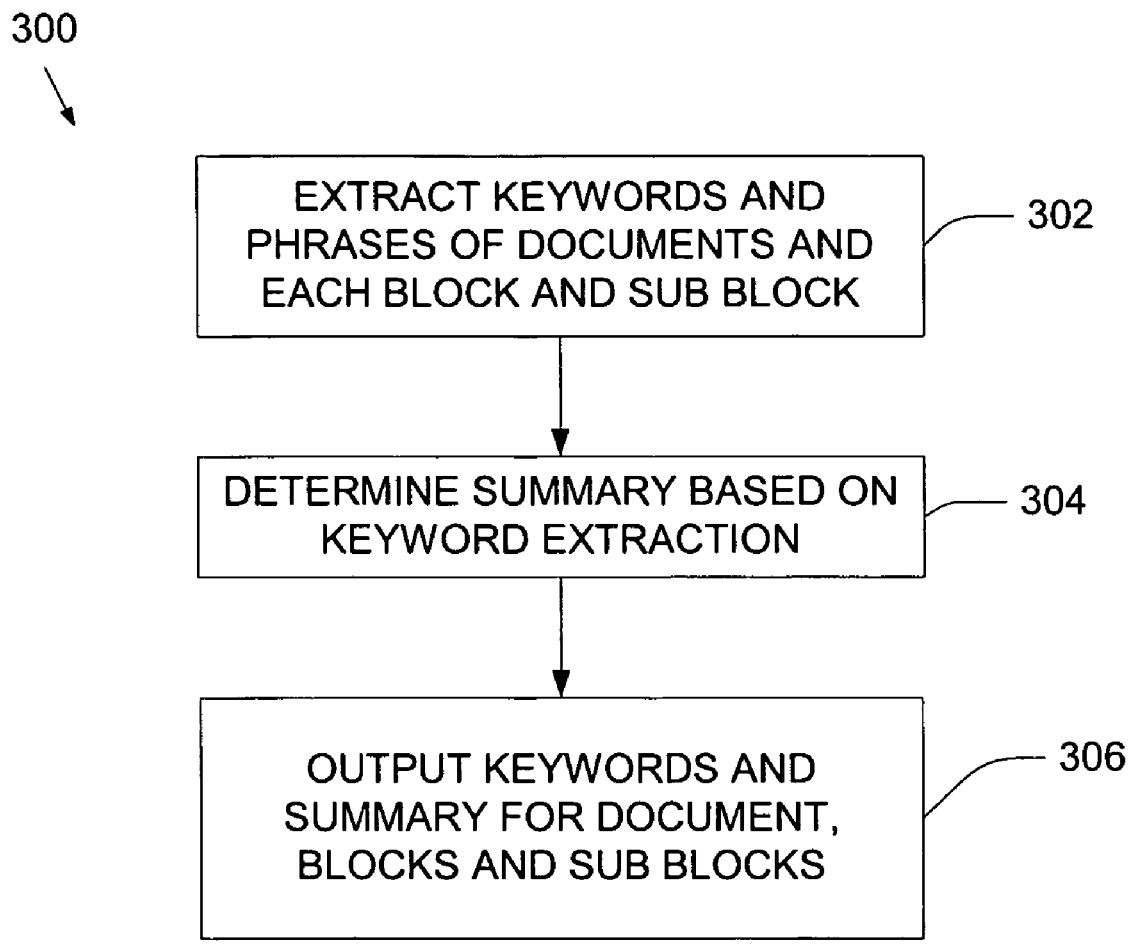
FIG. 10 is an exemplary method performed by a summarization module.
Figure 11:
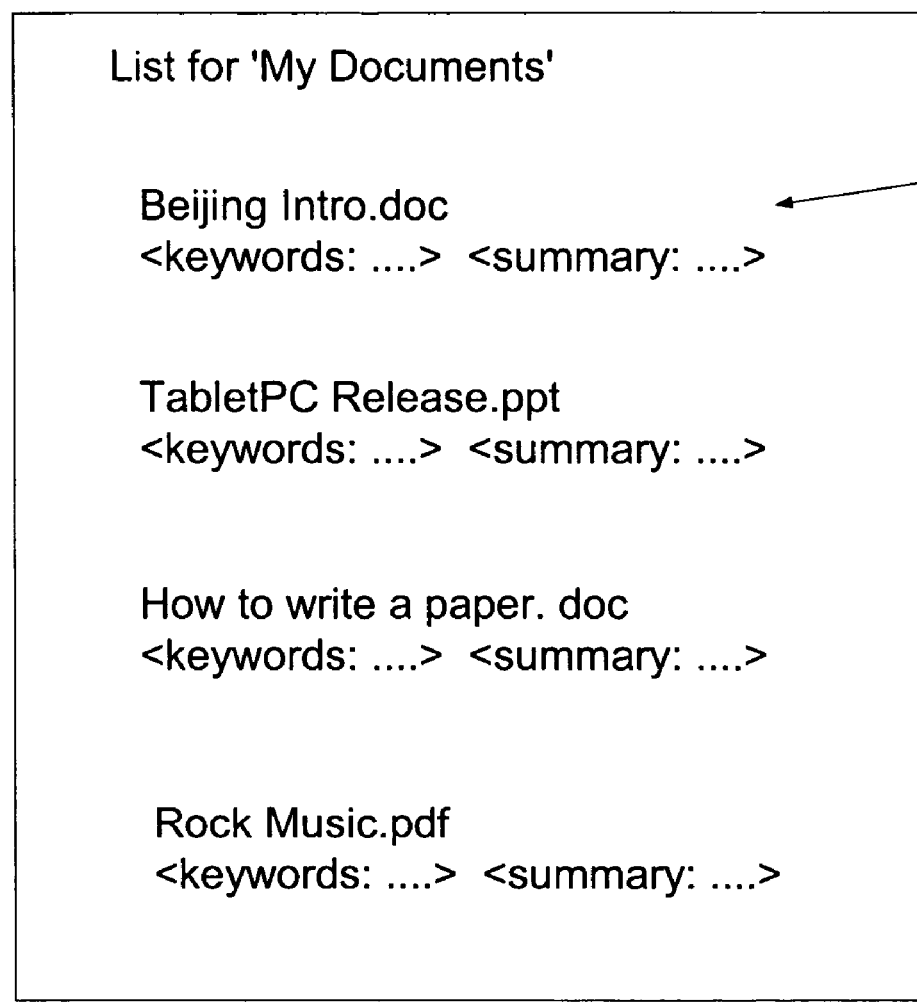
FIG. 11 is an exemplary screen shot of a mobile device.

The blocks and sub blocks are provided to summarization module 214 in order to determine keywords and summaries for a document. FIG. 10 illustrates a method 300 performed by summarization module 214 in order to determine the keywords and summaries. At step 302, keywords and phrases of the document and each block and sub block are extracted. Various methods for extracting keywords and phrases can be used according to the present invention. In one embodiment, an association-based method for key term extraction can be used. This method includes candidate generation using an association measure such as an N-gram model and independence detection, where phrases are evaluated based on their surrounding context. An N-gram model evalutes the likelihood of words occurring together in close proximity. Additionally, named-entities can be identified and used in determining keywords and phrases. These named entities include persons, places, organizations, locations, abbreviations, etc. The keywords selected may be associated with a particular score and keywords with higher scores may be used as keywords. In a further embodiment, a user may select the number of keywords provided by proxy server 14 to mobile device 18. At step 304, a summary is determined based on the keywords determined in step 302. In one embodiment, one or more sentences may be selected to be used as the summary of the associated document, block or sub block. After the keywords and summaries have been chosen for the blocks and sub blocks, the information is output at step 306. FIG. 11 illustrates an exemplary screen shot 310 with a plurality of document keywords and summaries provided to the user on mobile device 18. The documents include Beijing Intro.doc, Tablet PC Release.ppt, How to Write a Paper.doc and Rock Music.pdf. Each of the documents includes associated keywords and summary for the documents visible on the mobile device. As a result, a user is better able to select a particular document based on the relevance of the keywords and summary. In this instance, a user selects Beijing Intro.doc 312 to browse.

FIG. 12 illustrates a further screen shot 320 after the user has selected Beijing Intro.doc to browse. In the screen shot 320 of FIG. 12, the title 322 is displayed as well as four separate sections of the document. Each section is provided with an associated keyword or keywords and summary that is presented to the user such that a user may select a particular section based on more information than simply a section title, for example. In this example, the user selects section 3, denoted as 324, which is then presented to the user as illustrated as screen shot 330 in FIG. 13. Thus, a user-friendly method of browsing documents has been provided wherein a user is presented with keywords and summaries of documents as well as of blocks of text within documents. As a result, a user is able to quickly and easily find the document and portion of the document relevant to information the user wishes to access.

Figure 14:
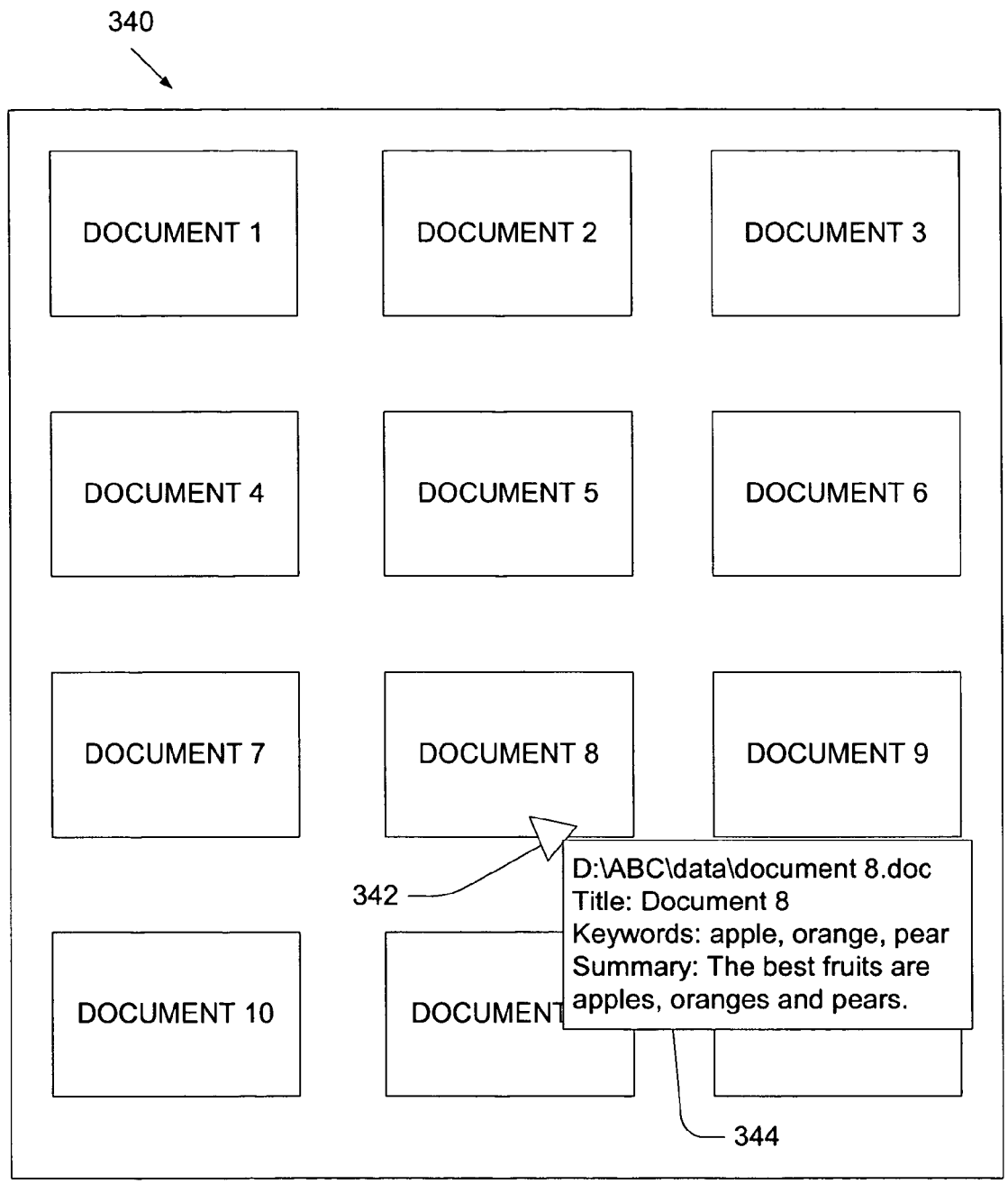
FIG. 14 is an exemplary screen shot of a desktop computer.

It will further be appreciated that the keyword and summary generation described with reference to method 300 may be applied to browsing documents on a desktop computer. FIG. 14 illustrates an exemplary screen shot 340 of a desktop computer that includes a plurality of documents. In one embodiment, the keywords and summary can be provided to the user if the user rolls over a document icon. The keywords and summary for a document can be created and/or revised when a user chooses to save, copy or download a document. Thus, each document and a user's computer can have an associated keywords and summaries automatically generated in order to aid the browsing process on a desktop computer. In FIG. 14, a cursor 342 has rolled over the icon for document 8 and data associated with document 8 is presented in a list 344. List 344 illustratively includes a path name, title, keywords and a summary. Listing this information aids the user in browsing documents. Other methods can be used to present information for the documents as well.

Although the present invention has been described with reference to particular embodiments, workers skilled in the art will recognize that changes may be made in form and detail without departing from the spirit and scope of the invention.

What is claimed is:

1. A computer-implemented method comprising:
receiving a document;
determining a file type for the document;
segmenting the document into blocks of text as a function of outline information if outline information is associated with the document;
if outline information is not associated with the document, then segmenting the document into blocks of text as a function of tags if tags are associated with the document;
if outline information and tags are not associated with the document, then performing:
a) identifying potential segmentation points in the document based on text in the document; and
b) segmenting the document into blocks of text based on the potential segmentation points and on a similarity of text adjacent the potential segmentation points;
determining if the blocks of text need to be further segmented based on a size of the blocks of text;
if the blocks need to be further segmented, then performing:
a) identifying potential segmentation points in the blocks based on text in the blocks; and
b) segmenting the blocks into sub-blocks of text based on the potential segmentation points in the blocks and on a similarity of text adjacent the potential segmentation points in the blocks; and
outputting at least one keyword and a summary for the document that is indicative of blocks of text in the document and generating at least one keyword and summary for any sub-blocks in the text.

2. The computer-implemented method of claim 1 wherein segmenting as a function of tags includes analyzing HTML tags in the document and segmenting text in the document based on the HTML tags.

3. The computer-implemented method of claim 2 wherein segmenting based on potential segmentation points further includes using a position of text in the document.

4. The computer-implemented method of claim 1 and further comprising providing at least one keyword and a summary for each block of text in the document.

5. The computer-implemented method of claim 1 and further comprising displaying the at least one keyword and summary.

6. The computer-implemented method of claim 1 and further comprising generating at least one keyword and a summary for individual blocks of text within the document.

7. The computer-implemented method of claim 1 and further comprising determining final segmentation points based on similarity of adjacent blocks of text surrounding the potential segmentation points.

8. The computer-implemented method of claim 1 and further comprising converting an audio file to a text document.

9. A mobile device for handling documents, comprising:
a document retrieval module retrieving a plurality of documents from at least one document source based on a document query request received from a mobile device;
a document outline parsing module determining a file type of each of the plurality of documents and for each document:
segmenting the document into blocks of text as a function of outline information if outline information is associated with the document;
if outline information is not associated with the document, then segmenting the document into blocks of text as a function of tags if tags are associated with the document;
if outline information and tags are not associated with the document, then establishing potential segmentation points in the document as a function of the text in the document and segmenting the document into blocks of text based on the potential segmentation points and on a similarity of adjacent paragraphs surrounding the potential segmentation points;
determining if the blocks of text need to be further segmented based on a size of the blocks of text;
if the blocks of text need to be further segmented, then producing sub-blocks of text from the blocks of text based on potential segmentation points in the blocks of text and on a similarity of adjacent paragraphs surrounding the potential segmentation points in the blocks of text; and
forming a tree structure indicative of the blocks and sub-blocks; and a summarization module outputting at least one keyword and a summary for each block and sub-block in each of the plurality of documents based on the tree structure to selectively render the at least one keyword, summary, blocks and sub-blocks of text as a function of input to the mobile device.

10. The mobile device of claim 9 wherein the document outline parsing module further analyzing HTML tags in the document and segmenting text in the document based on the HTML tags.

11. The mobile device of claim 10 wherein the document outline parsing module further segmenting the document using a position of text in the document.

12. The mobile device of claim 9 and further comprising a module displaying the at least one keyword and summary.

13. The mobile device of claim 9 and further comprising a module converting an audio file to a text document.

\* \* \* \* \*